3,547,858
HYDROLYSIS OF ESTERS IN THE MOLTEN STATE
Roy Worrall, Newport, England, assignor to Monsanto Chemicals Limited, London, England, a British company
No Drawing. Continuation of application Ser. No. 639,631, May 19, 1967. This application Aug. 27, 1969, Ser. No. 853,527
Int. Cl. C08f 27/16
U.S. Cl. 260—87.3    9 Claims

ABSTRACT OF THE DISCLOSURE

Polymers and/or interpolymers of esters of an unsaturated alcohol are subjected to the action of a hydrolyzing agent while the polymers are in the molten state.

CROSS-REFERENCE TO RELATED APPLICATION

This application is a continuation of application Ser. No. 639,631, filed May 19, 1967, now abandoned.

BACKGROUND OF THE INVENTION

This invention relates to an improved process for producing polymers containing hydroxyl groups, the term "polymers" being hereinafter employed throughout the specification and claims to mean either homopolymers or copolymers.

It is well known that polymers containing ester groups such as, for example, polyvinyl acetate, can be hydrolyzed, either partially or completely, to yield polymeric products containing hydroxyl groups which have such improved properties as to make them highly useful in many applications for which the unhydrolyzed polymer is not suitable. The known processes for hydrolysis, however, suffer from certain drawbacks in that they require the use of an aqueous or solvent medium in which the polymers are dissolved or slurried. This in turn necessitates additional processing steps for removal of such media and/or recovery of the hydrolyzed polymer product and such processing, besides being costly, can easily result in degradation of the hydrolyzed polymeric product.

SUMMARY

According to the invention, a new and improved process is provided for the production of polymers containing hydroxyl groups which comprises subjecting a polymer of an ester of an unsaturated alcohol to the action of a hydrolyzing agent while the polymer is in the molten state. The hydrolyzed product is obtained directly without any necessity for further processing to remove any extraneous treating materials. Little opportunity is thus presented for the deterioration or degradation possible in the solution processes which are conventionally practiced in the art.

In general, the hydrolyzed products of the invention possess greater toughness than the polymers from which they are derived, and it has been found in many instances that when in an oriented form, such as is produced for example, by "drawing" a filament or film of the hydrolyzed polymer, that they possess a considerably improved strength.

DESCRIPTION OF THE PREFERRED EMBODIMENTS

The starting material is a polymer of an ester of an unsaturated alcohol. The unsaturated alcohol from which the ester is derived is normally aliphatic and can be, for example, vinyl alcohol (notionally), a substituted vinyl alcohol, allyl alcohol, methallyl alcohol, crotyl alcohol and the like. Alternatively, it can be a cyclic alcohol such as 2-cyclohexene-1-ol. Suitable esters include those formed by the combination of the alcohol with an aliphatic monocarboxylic acid such as acetic, propionic, butyric, caprylic, or stearic acid, or an aromatic monocarboxylic acid, such as benzoic acid or toluic acid. Alternatively, the ester can be of an acid containing two or more carboxylic groups such as phthalic acid, maleic acid or fumaric acid. The preferred esters are those of the notional vinyl alcohol with a lower saturated monocarboxylic acid, such as for example, vinyl acetate or vinyl propionate.

Where the polymer starting material is a copolymer, the comonomer is preferably an olefinic hydrocarbon, but it can be another olefinic monomer such as for instance vinyl chloride, allyl chloride, acrylonitrile, acrylic acid, methyl methacrylate or maleic anhydride. A copolymer of two or more unsaturated esters can likewise be hydrolyzed by the process described herein.

The process of the present invention is particularly applicable to the hydrolysis of a copolymer of an olefinic hydrocarbon and an ester of an unsaturated alcohol. The olefinic hydrocarbon component can be a monoolefin such as ethylene, propylene, 1-butene, isobutene or a higher homolog thereof having either a straight or branched chain, for example, 1-hexene or 2,2-trimethylpentene-1. The olefin hydrocarbon component can also be or can contain a cyclic olefin such as cyclopentene, or a compound having more than one olefinic bond, for example, butadiene, isoprene or 1,5-hexadiene, or an aryl olefin such as styrene. Two or more olefins can be present in the copolymer if desired. Ethylene is the preferred comonomer. The proportion of ester in a copolymer starting material can range up to 90% by weight; more usually it is in the range from 3% to 50% by weight and, preferably, from about 5% to about 25% by weight.

In the hydrolysis reaction, ester groups in the polymer starting material are replaced by hydroxyl groups. Water can be used as a hydrolyzing agent but preferably an alcohol is used, particularly, a lower alkyl alcohol such as, for example, methanol, ethanol or a propanol or butanol. Preferably, too, a catalyst is present, particularly an alkaline-reacting catalyst such as an alkali metal hydroxide or, where an alcohol is the hydrolyzing agent, an alkali metal derivative of the alcohol. Quaternary ammonium hydroxides such as tetrabutylammonium hydroxide are also useful. Acid catalysts such as sulfuric acid can be used if desired. The preferred hydrolyzing agent is a solution of sodium methoxide or of lithium methoxide in methanol. Where a catalyst is employed, this is preferably present in an amount up to 5% by weight of the hydrolyzing agent, with amounts from 0.1% to 2% by weight being generally employed.

Not all of the ester groups in the polymer need be hydrolyzed; for many purposes a partial hydrolysis, for example, up to 30% is sufficient. In any event, the hydrolyzing agent needs to be employed in a sufficient stoichiometric proportion to hydrolyze the polymer to the desired degree, and very often it is preferable to operate using a small excess of hydrolyzing agent. Such an excess can be, for example, about 10% to 20%, but a greater excess is not usually required and the weight of hydrolyzing agent is desirably less than the weight of polymer starting material.

The polymer, as been stated, is in the molten state, and the reaction temperature is thus, of course, higher than that at which the polymer melts. However, the temperature should not be sufficiently high to cause decomposition of the polymer. A temperature between 30 and 150° C. higher than that at which the polymer melts is generally satisfactory. The presence of the hydrolyzing agent can soften the polymer and thus cause the polymer melting point to be depressed, in some instances by up to 30° C. below its ordinary value. This effect needs to be considered in choosing an appropriate reaction temperature. If a reaction temperature above the polymer melting point (as explained above) is inconveniently high for operation with relatively volatile hydrolyzing agents such as for instance a lower alkyl alcohol, the melting point can, if desired, be lowered by the addition of a suitable softening agent. Liquids, preferably organic in character, which soften but do not dissolve the polymer under the reaction conditions are used for this purpose. Examples of suitable softening agents include such hydrocarbon liquids as the petroleum fraction known as white spirits or an aromatic or naphthenic fraction such as, for example, benzene, toluene, xylene or cyclohexane.

The process can be carried out at atmospheric pressure, but generally the use of an elevated pressure such as from 5 to 5,000 p.s.i. and, preferably, from 500 to 2,000 p.s.i.g. is employed in order to prevent evaporation of the hydrolyzing agent or of any softening agent employed. The hydrolyzing agent can be present as a gas or vapor.

The process can be conducted either as a batch or a continuous operation. It is often convenient to effect batch hydrolysis in a reaction vessel provided with some means of agitation that can be sealed from the atmosphere and heated to the appropriate temperature. It is, for example, convenient to use a Banbury or other internal mixer as the reaction vessel. A time from a few seconds to several minutes is normally all that is necessary to complete the reaction. A period of time between 10 seconds and 30 minutes, and preferably between 25 seconds and 10 minutes, is usually employed. The hydrolysis can be continued until substantial equilibrium is reached, or it can be stopped at an intermediate stage. At the end of the hydrolysis, the pressure in the reaction vessel is released and the hydrolyzed polymer is removed. Any excess of hydrolyzing agent, catalyst residues and softening agent if used can then if desired be removed by washing with a suitable liquid, for example, water, but washing is not usually essential.

For a continuous hydrolysis process, the use of a kneader or a screw extruder is often particularly convenient. The hydrolyzing agent is either fed into the machine hopper together with a polymer starting material or, preferably, injected separately into the interior of the apparatus particularly at a point where some heat-softening of the polymer has already taken place. The hydrolysis reaction then proceeds as the mixture is forwarded through the apparatus, and with an appropriate adjustment of forwarding rate, the residence time can be chosen so that reaction is completed to the required degree by the time the mixture reaches the mouth of apparatus. An appropriate die can, of course, be fitted to an extruder where a particular extruded section is required. For instance, a sheet or blown film can be produced, or the polymer being processed can be extruded as a rod and subsequently cut into pellets. It is also possible to include a blowing agent, for instance a gas or vapor, a volatile liquid or a substance that yields gas by thermal decomposition, so that the hydrolyzed polymer is extruded in the form of a foam. A volatile hydrocarbon, for example, butane, is often a particularly useful blowing agent and this can also act as a softening agent as described in a previous paragraph. A nucleating agent, for example, a finely-divded solid such as silica, can be present also if desired in order to facilitate the production of a large number of small cells.

It is also possible to carry out a continuous hydrolysis process in the extruder of a blow-molding machine or in the preplasticizing section of a screw-preplasticizing injection-molding machine, so that shaped articles are produced directly.

The invention is illustrated by the following examples which are not, however, to be construed as limiting it in any manner whatsoever.

EXAMPLE 1

A copolymer containing 87.5% by weight of ethylene and 12.5% by weight of vinyl acetate was fed at a rate of 15 grams per minute through an extruder having a barrel one inch in diameter and 24 inches long. The average temperature of the copolymer in the barrel was 150° C. At a point 11 inches along the extruder barrel, a solution of 1.4% by weight of sodium methoxide in methanol was injected at a rate of 6 grams per minute. The residence time of the polymer after injection of the methanol was approximately one minute, and at the end of the extruder it was extruded into the atmosphere through a simple circular orifice die 0.03 inch in diameter. The extruded polymer was cooled and chopped into small granules.

The product could be fabricated by all ordinary plastic techniques such as for instance injection-molding, extrusion, blow-extrusion or blow-molding. It was much harder than the original starting co-polymer and it was calculated from the change in the optical density of a thin film of the polymer at a wave-length of 5.7 microns (CO absorption) when compared with that at a wave-length of 6.7 microns ($CH_2$ absorption) that 83% of the acetate groups had been hydrolyzed to hydroxyl groups.

EXAMPLE 2

A number of hydrolysis reactions were carried out as described in Example 1, but using various types and proportions of catalyst and various extruder barrel temperatures as noted in the table below. The table also shows the degree of hydrolysis (estimated as in Example 1) achieved in each case.

| Catalyst | Catalyst, percent by weight | Extruder temp., °C. | Degree of hydrolysis, percent |
| --- | --- | --- | --- |
| Sodium methoxide | 0.3 | 150 | 25 |
| Do | 0.7 | 150 | 23 |
| Do | 3.0 | 225 | 78 |
| Lithium methoxide | 0.5 | 150 | 32 |
| Tetrabutylammonium-hydroxide | 4.0 | 150 | 7 |

The products were all found to be harder and stronger than the original starting copolymer, the change becoming more noticeable as the degree of hydrolysis increased.

EXAMPLE 3

Two copolymers of ethylene and vinyl acetate containing 30% and 45% by weight of vinyl acetate, respectively, the balance being ethylene, were hydrolyzed by the method described in Example 1. It was found in the first case that the degree of hydrolysis was 80% while in the second case it was 34%.

Again, the products were found to be harder and stronger than the starting copolymers.

EXAMPLE 4

A copolymer of 16% by weight of ethylene and 84% by weight of vinyl acetate was fed at a rate of 9 grams per minute through the extruder described in Example 1 while an 8.8% by weight solution of sodium methoxide in methanol was injected into the extruder barrel. The reaction conditions were otherwise similar to those stated in Example 1.

The product was obtained in which 96% of the ester groups had been replaced by hydroxyl groups. It was much harder and stronger than the starting copolymer.

EXAMPLE 5

Polyvinyl acetate was hydrolyzed by the method described in Example 4 except that the rate of injection of the sodium methoxide solution was 14 grams per minute and the temperature of the extruder barrel was 160° C. The resulting polymer had a degree of hydrolysis of 72%.

What is claimed is:

1. A process for the production of a polymer containing hydroxyl groups which comprises subjecting a copolymer of an olefinic hydrocarbon and an ester of an unsaturated alcohol selected from the group consisting of vinyl alcohol, allyl alcohol, methallyl alcohol and crotyl alcohol and an aliphatic monocarboxylic acid selected from the group consisting of acetic, propionic, butyric, caprylic and stearic acids to the action of a primary lower alkyl alcohol while the copolymer is in the molten state, the amount of said alcohol being at least that sufficient to provide the stoichiometric proportions sufficient to hydrolyze the copolymer to the desired degree but limited to an amount by weight which is less than the weight of the copolymer starting material.

2. The process of claim 1 wherein said copolymer is a copolymer of ethylene and vinyl acetate.

3. The process of claim 2 wherein said copolymer of ethylene and vinyl acetate contains from 3% to 50% by weight of vinyl acetate.

4. The process of claim 3 wherein an alkaline-reacting catalyst is employed.

5. The process of claim 4 wherein said alkaline-reacting catalyst is selected from the group consisting of alkali metal hydroxides, alkali metal alkoxides and quaternary ammonium hydroxides.

6. The process of claim 5 wherein hydrolysis is effected at a reaction temperature between 30° and 150° C. higher than that at which the polymer melts and at a pressure from about 5 to about 5,000 p.s.i.

7. The process of claim 6 wherein said hydrolyzing agent is methanol.

8. The process of claim 7 wherein said alkaline-reacting catalyst is sodium methoxide.

9. The process of claim 8 wherein said copolymer contains from 5 to 25% by weight of vinyl acetate.

References Cited
UNITED STATES PATENTS

| | | | |
|---|---|---|---|
| 2,399,653 | 5/1946 | Roland | 260—87.3 |
| 2,545,182 | 3/1951 | Whetstone et al. | 260—91.3 |
| 2,657,201 | 10/1953 | Nebel | 260—91.3 |

JOSEPH L. SCHOFER, Primary Examiner

J. C. HAIGHT, Assistant Examiner

U.S. Cl. X.R.

260—80.8, 80.81, 83.5, 85.5, 85.7, 87.5, 91.3

PO-1050
(5/69)

UNITED STATES PATENT OFFICE
CERTIFICATE OF CORRECTION

Patent No. 3,547,858      Dated December 15, 1970

Inventor(s) Roy Worrall

It is certified that error appears in the above-identified patent and that said Letters Patent are hereby corrected as shown below:

In the heading of the patent, Column 1, line 8, following "Ser. No. 853,527" insert -- Claims priority, application Great Britain, May 26, 1966, 23,522/66 --.

Signed and sealed this 26th day of October 1971.

(SEAL)
Attest:

EDWARD M. FLETCHER, JR.    ROBERT GOTTSCHALK
Attesting Officer    Acting Commissioner of Pater